US008539606B2

(12) United States Patent
Zhang

(10) Patent No.: US 8,539,606 B2
(45) Date of Patent: Sep. 17, 2013

(54) DATA PROTECTION METHOD AND DATA PROTECTION SYSTEM

(75) Inventor: Gong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/540,288

(22) Filed: Jul. 2, 2012

(65) Prior Publication Data

US 2013/0042113 A1 Feb. 14, 2013

Related U.S. Application Data

(63) Continuation of application No. PCT/CN2011/078384, filed on Aug. 12, 2011.

(51) Int. Cl.
*H04L 9/08* (2006.01)
*H04L 9/30* (2006.01)
*G06F 21/10* (2013.01)

(52) U.S. Cl.
CPC ............ *H04L 9/0825* (2013.01); *H04L 9/0827* (2013.01); *G06F 21/10* (2013.01)
USPC .................. 726/27; 380/44; 380/45; 380/285

(58) Field of Classification Search
None
See application file for complete search history.

(56) References Cited

U.S. PATENT DOCUMENTS

| 6,061,448 | A * | 5/2000 | Smith et al. | 380/282 |
| 6,937,726 | B1 * | 8/2005 | Wang | 380/30 |
| 7,286,665 | B1 * | 10/2007 | Wang | 380/30 |
| 8,094,810 | B2 * | 1/2012 | Hohenberger et al. | 380/28 |
| 2007/0088660 | A1 | 4/2007 | Abu-Amara | |
| 2009/0205036 | A1 | 8/2009 | Slaton et al. | |
| 2010/0332479 | A1 | 12/2010 | Prahlad et al. | |

FOREIGN PATENT DOCUMENTS

| CN | 101288082 A | 10/2008 |
| CN | 101702725 A | 5/2010 |
| CN | 101833623 A | 9/2010 |
| CN | 101854392 A | 10/2010 |
| CN | 102111269 A | 6/2011 |

OTHER PUBLICATIONS

Giuseppe Ateniese, Kevin Fu, Matthew Green, and Susan Hohenberger. 2006. Improved proxy re-encryption schemes with applications to secure distributed storage. ACM Trans. Inf. Syst. Secur. 9, 1 (Feb. 2006), 1-30.*
Matt Blaze, G. Bleumer, and M. Strauss. Divertible protocols and atomic proxy cryptography. In Proceedings of Eurocrypt '98, vol. 1403, pp. 127-144, 1998.*

* cited by examiner

*Primary Examiner* — Matthew Henning

(57) ABSTRACT

Present invention provides a data protection method, used by a data owner to share data with a data sharer securely through a data distribution system. The data owner first establishes a proxy relationship with the data sharer, while the data distribution system maintains a proxy relationship between the data owner and the data sharer, and after receiving encrypted shared data sent by the data owner, the data distribution system changes the encrypted shared data according to the proxy relationship, so that the data sharer may decrypt the data. By using the data protection method in the present invention, both encryption and decryption of data are a result of coordination of three parties, thereby avoiding a problem of data leakage caused by a problem of a single party.

7 Claims, 7 Drawing Sheets

DATA PROTECTION METHOD AND DATA PROTECTION SYSTEM

CROSS-REFERENCE TO RELATED APPLICATIONS

This application is a continuation of International Application No. PCT/CN2011/078384, filed on Aug. 12, 2011, which is hereby incorporated by reference in their entireties.

FIELD OF THE INVENTION

The present invention relates to data sharing technologies, and in particular, to a data sharing method and system for encrypting shared data.

BACKGROUND OF THE INVENTION

In recent years, data center and cloud computing technologies are developed rapidly. Compared with a conventional computing mode, cloud computing has an unparalleled advantage in aspects such as reliability and scalability. More and more enterprises and individuals choose to store their own data in a storage system of a cloud computing network. At the same time, applications of the data center and cloud computing technologies also bring new challenges. A main challenge is that an owner of data and a manager of data are no longer a same party, and an enterprise or an individual, as the owner of the data, stores the data in the storage system of the cloud computing network, while the cloud computing network becomes the manager of the data. On the one hand, a user (the owner of data) expects to make use of computing, storing, and communication capabilities of the cloud computing network to finish a lot of work; on the other hand, the user does not completely trust the cloud computing network. Therefore, efforts are always made in the industry to seek a method for protecting data of a data owner from being illegally obtained.

SUMMARY OF THE INVENTION

An embodiment of the present invention provides a data protection method, including: establishing, by a data owner, a proxy relationship with a data sharer, and generating a proxy relation $rk_{A \to B}$ according to a private key of the data owner $sk_A=(S_{A1}, S_{A2})$ and a public key of the data sharer $pk_B=(P_{B1}, P_{B2})$; sending, by the data owner, proxy relationship information and the proxy relation $rk_{A \to B}$ to a data distribution system, where the proxy relationship information includes information about the proxy relationship established between the data owner and the data sharer; updating, by the data distribution system, a proxy relationship table of the data owner according to the proxy relationship information, and establishing a mapping relationship between the proxy relation $rk_{A \to B}$ and the data sharer; generating, by the data owner, a secret value m of shared data, and encrypting the shared data by using the secret value m; encrypting, by the data owner and by using a public key of the data owner $pk_A=(P_{A1}, P_{A2})$, the secret value m to obtain an upper-layer key; sending, by the data owner, the shared data encrypted by the secret value m and the upper-layer key to the data distribution system; after receiving the encrypted shared data the upper-layer key, searching, by the data distribution system, the proxy relationship table and confirming the proxy relationship between the data owner and the data sharer, and when the data distribution system confirms that the proxy relationship is established between the data owner and the data sharer, obtaining, by the data distribution system, the proxy relation $rk_{A \to B}$ corresponding to the data sharer; updating, by the data distribution system, the upper-layer key according to the proxy relation $rk_{A \to B}$ to obtain an updated upper-layer key; sending, by the data distribution system, the encrypted shared data and the updated upper-layer key to the data sharer; decrypting, by the data sharer and according to a private key of the data sharer $sk_B=(S_{B1}, S_{B2})$, the updated upper-layer key to obtain the secret value m; and decrypting, by the data sharer, the encrypted shared data according to the secret value m to obtain the shared data.

An embodiment of the present invention also provides a corresponding data sharing system, including: a data owner, a data distribution system, and a data sharer. The data owner distributes shared data to the data sharer through the data distribution system; the data owner includes a proxy relationship establishing module, a key generating module, and a shared data sending module; the data distribution system includes a receiving module, a proxy relationship maintaining module, an upper-layer key updating module, and a shared data distributing module; and the data sharer includes an obtaining module and a decrypting module. The proxy relationship establishing module is configured to establish a proxy relationship with the data sharer, generate a proxy relation $rk_{A \to B}$ according to a private key of the data owner $sk_A=(S_{A1}, S_{A2})$ and a public key of the data sharer $pk_B=(P_{B1}, P_{B2})$, and send proxy relationship information and the proxy relation $rk_{A \to B}$ to the data distribution system, where the proxy relationship information includes information about the proxy relationship established between the data owner and the data sharer; the key generating module is configured to generate a secret value m of the shared data, encrypt the shared data by using the secret value m, and encrypt the secret value m by using a public key of the data owner $pk_A=(P_{A1}, P_{A2})$ to obtain an upper-layer key; the shared data sending module is configured to send the encrypted shared data and the upper-layer key to the data distribution system; the receiving module is configured to obtain the proxy relationship information, the proxy relation, the encrypted shared data, and the upper-layer key that are from the data owner; the proxy relationship maintaining module is configured to update a proxy relationship table of the data owner according to the proxy relationship information, and establish a mapping relationship between the proxy relation $rk_{A \to B}$ and the data sharer, and when the receiving module receives the encrypted shared data and the upper-layer key, the proxy relationship maintaining module is further configured to search the proxy relationship table and confirm the proxy relationship between the data owner and the data sharer, and obtain the proxy relation $rk_{A \to B}$ corresponding to the data sharer after confirming that the proxy relationship is established between the data owner and the data sharer; the upper-layer key updating module is configured to update the upper-layer key according to the proxy relation to obtain an updated upper-layer key; the distributing module is configured to send the shared data and the updated upper-layer key to the data sharer; the obtaining module is configured to receive the shared data and the updated upper-layer key that are from the data distribution system; and the decrypting module is configured to decrypt the updated upper-layer key according to a private key of the data sharer $sk_B=(S_{B1}, S_{B2})$ to obtain the secret value m.

An embodiment of the present invention further provides a data distribution system, including a receiving module, a proxy relationship maintaining module, an upper-layer key updating module, and a shared data distributing module. The receiving module is configured to obtain, from a data owner, information about a data sharer establishing a proxy relationship with the data owner, a proxy relation generated by using both a key of the data owner and a key of the data sharer, shared data encrypted by the data owner by using a secret value m, and an upper-layer key of the shared data, where the upper-layer key is generated by the data owner by encrypting the secret value m by using the key of the data owner. The proxy relationship maintaining module is configured to establish and maintain a proxy relationship table according to the information about the data sharer, search, when receiving the encrypted shared data and the upper-layer key, the proxy relationship table to confirm the data sharer establishing the proxy relationship with the data owner, and obtain the proxy relation generated by using both the key of the data owner and the key of the data sharer. The upper-layer key updating module is configured to update the upper-layer key according to the proxy relation to obtain an updated upper-layer key, so that the data sharer may decrypt the updated upper-layer key according to the key of the data sharer to obtain the secret value m. The distributing module is configured to send the shared data and the updated upper-layer key to the data sharer.

An embodiment of the present invention further provides a data protection method, including: receiving, by a data distribution system, proxy relationship information and a proxy relation $f_{AB}$ that are sent by a data owner, where the data owner establishes a proxy relationship with a data sharer, the proxy relationship information includes information about the proxy relationship established between the data owner and the data sharer, and the proxy relation is generated according to a private key of the data owner $sk_A$ and a public key of the data sharer $pk_B$; updating, by the data distribution system, a proxy relationship table of the data owner according to the proxy relationship information, and establishing a mapping relationship between the proxy relation $f_{AB}$ and the data sharer, where the proxy relationship table is used to record information about a data sharer establishing a proxy relationship with the data owner; receiving, by the data distribution system, shared data and an upper-layer key that are sent by the data owner, where the shared data is encrypted by a secret value m which is of the shared data and generated by the data owner, and the upper-layer key is obtained by the data owner by encrypting the secret value m by using a public key of the data owner $pk_A$; after receiving the encrypted shared data and the upper-layer key, searching, by the data distribution system, the proxy relationship table and confirming the proxy relationship between the data owner and the data sharer, and when the data distribution system confirms that the proxy relationship is established between the data owner and the data sharer, obtaining, by the data distribution system, the proxy relation $f_{AB}$ corresponding to the data sharer; updating, by the data distribution system, the upper-layer key according to the proxy relation $f_{AB}$ to obtain an updated upper-layer key; sending, by the data distribution system, the encrypted shared data and the updated upper-layer key to the data sharer, so that the data sharer decrypts the updated upper-layer key according to a private key of the data sharer $sk_B$ to obtain the secret value m, and further the data sharer decrypts the encrypted shared data according to the secret value m to obtain the shared data.

An embodiment of the present invention further provides a data sharing system, including multiple data distribution systems. Each one of the multiple data distribution systems is configured to record a proxy relationship established between a data owner and a data sharer, and each one of the data distribution systems maintains a proxy relation corresponding to the proxy relationship, where the proxy relation is generated by using both a data owner key of the data owner and a data sharer key of the data sharer; when the multiple data distribution systems receive shared data sent by the data owner, and the data owner encrypts a secret value m of the shared data by using the data owner key to obtain an upper-layer key, each one of the multiple data distribution systems updates the upper-layer key according to the proxy relation separately maintained by itself, and then sends an updated upper-layer key to the data sharer separately, so that the data sharer may combine and decrypt multiple updated upper-layer keys sent by the multiple data distribution systems to obtain the secret value m.

With the data protection method provided in the embodiment of the present invention, the data owner first establishes the proxy relationship with the data sharer, while the data distribution system needs to update the upper-layer key of the shared data according to the proxy relationship. As a result, an entire encryption process of the shared data is actually completed by three parties together, namely, the data owner, the data distribution system, and the data sharer, thereby avoiding leakage of shared data caused by a fault of a single party.

BRIEF DESCRIPTION OF THE DRAWINGS

To illustrate the technical solutions of the embodiments of the present invention more clearly, accompanying drawings required for describing the embodiments are briefly described below. Evidently, the accompanying drawings in the following description are only some embodiments of the present invention and persons of ordinary skill in the art may further obtain other drawings according to these accompanying drawings without creative efforts.

DETAILED DESCRIPTION OF THE EMBODIMENTS

The technical solutions in the embodiments of the present invention are described clearly and completely below with reference to the accompanying drawings in the embodiments of the present invention. Evidently, the described embodiments are only part of rather than all of the embodiments of the present invention. All other embodiments, which are obtained by persons of ordinary skill in the art based on the embodiments in the present invention without creative efforts, shall fall within the scope of the present invention.

A data sharing method provided in the embodiments of the present invention is used to help a data owner securely send shared data to a data sharer that establishes a proxy relationship with the data owner, and includes three main methods: a data protection method in which the data owner encrypts the shared data, a data distribution method in which a data distribution system shares data with the data sharer after receiving encrypted data sent by the data owner, and a data decryption method in which the data sharer decrypts obtained encrypted data to obtain the shared data.

Figure 1:
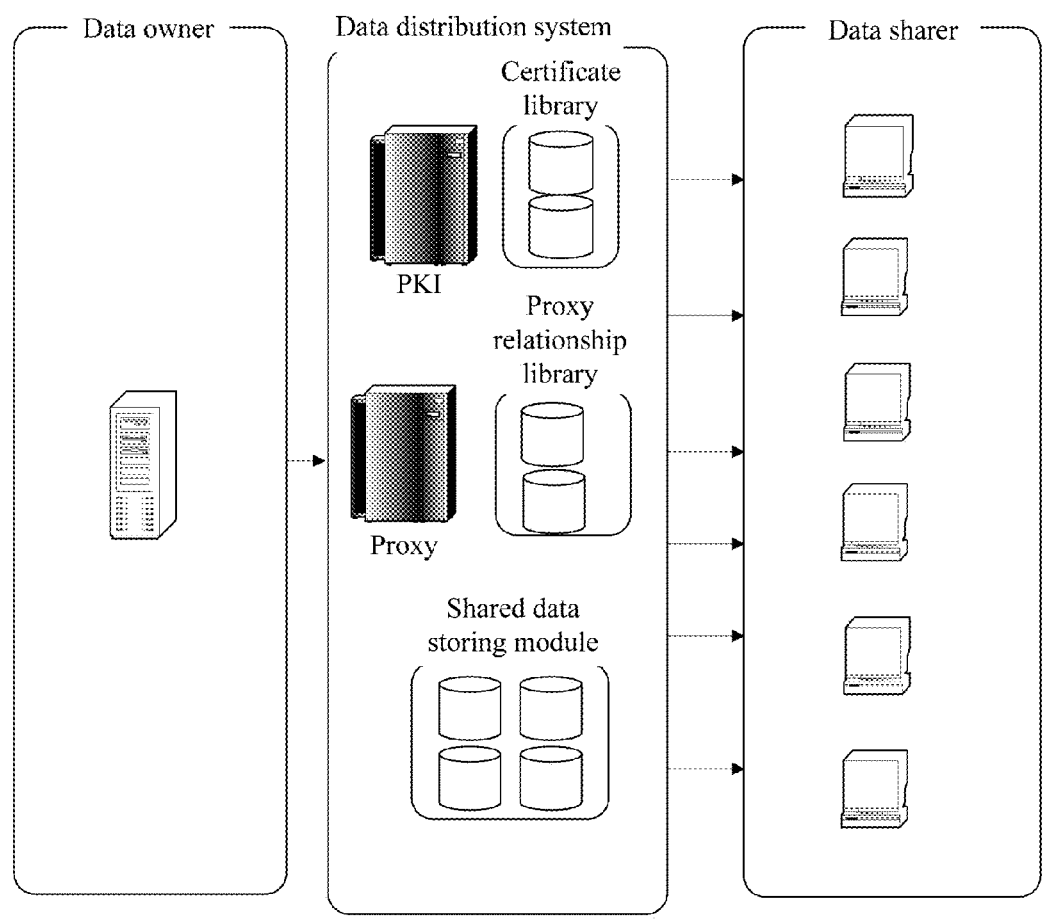
FIG. 1 is an overall architecture diagram of a data sharing system according to an embodiment of the present invention.
Figure 2:
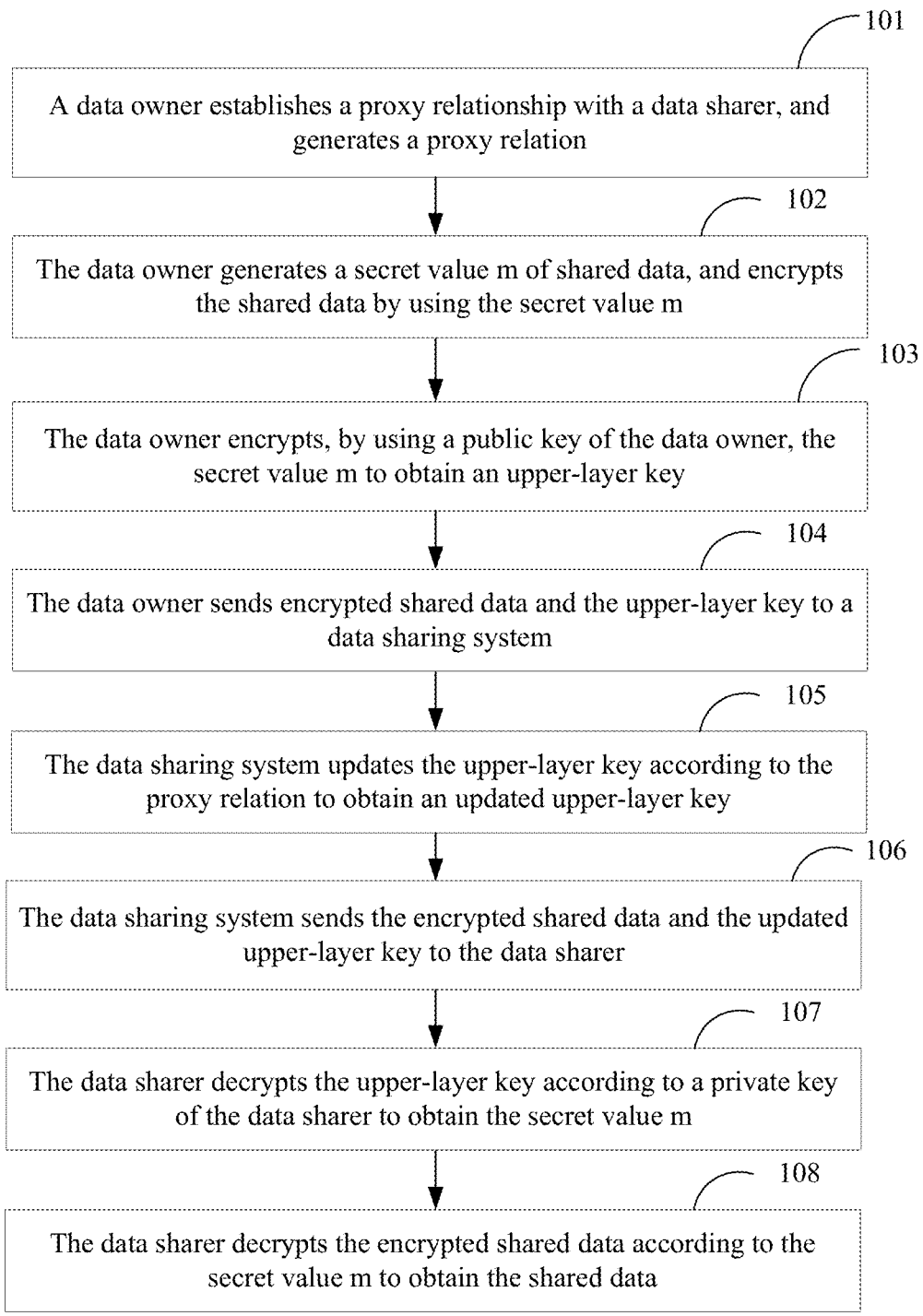
FIG. 2 is a schematic diagram of a data protection method according to an embodiment of the present invention.

Referring to FIG. 1, FIG. 1 is an architecture diagram of a data sharing system using a data protection method according to an embodiment of the present invention. The data sharing system includes a data owner, a data distribution system, and a data sharer. When the data owner expects to upload data to the data distribution system for the data sharer to obtain, referring to FIG. 2, the data protection method according to an embodiment of the present invention includes:

Step 101: A data owner establishes a proxy relationship with a data sharer, and generates a proxy relation.

Step 102: The data owner generates a secret value m of shared data, and encrypts the shared data by using the secret value m.

Step 103: The data owner encrypts, by using a public key of the data owner, the secret value m to obtain an upper-layer key.

Step 104: The data owner sends encrypted shared data and the upper-layer key to the data sharing system.

Step 105: The data sharing system updates the upper-layer key according to the proxy relation to obtain an updated upper-layer key.

Step 106: The data sharing system sends the encrypted shared data and the updated upper-layer key to the data sharer.

Step 107: The data sharer decrypts the upper-layer key according to a private key of the data sharer to obtain the secret value m.

Step 108: The data sharer decrypts the encrypted shared data according to the secret value m to obtain the shared data.

With the data protection method provided in the embodiment of the present invention, the data owner first establishes the proxy relationship with the data sharer, while the data distribution system needs to update the upper-layer key of the shared data according to the proxy relationship. As a result, an entire encryption process of the shared data is actually completed by three parties together, namely, the data owner, the data distribution system, and the data sharer, thereby avoiding leakage of shared data caused by a fault of a single party.

Figure 3:
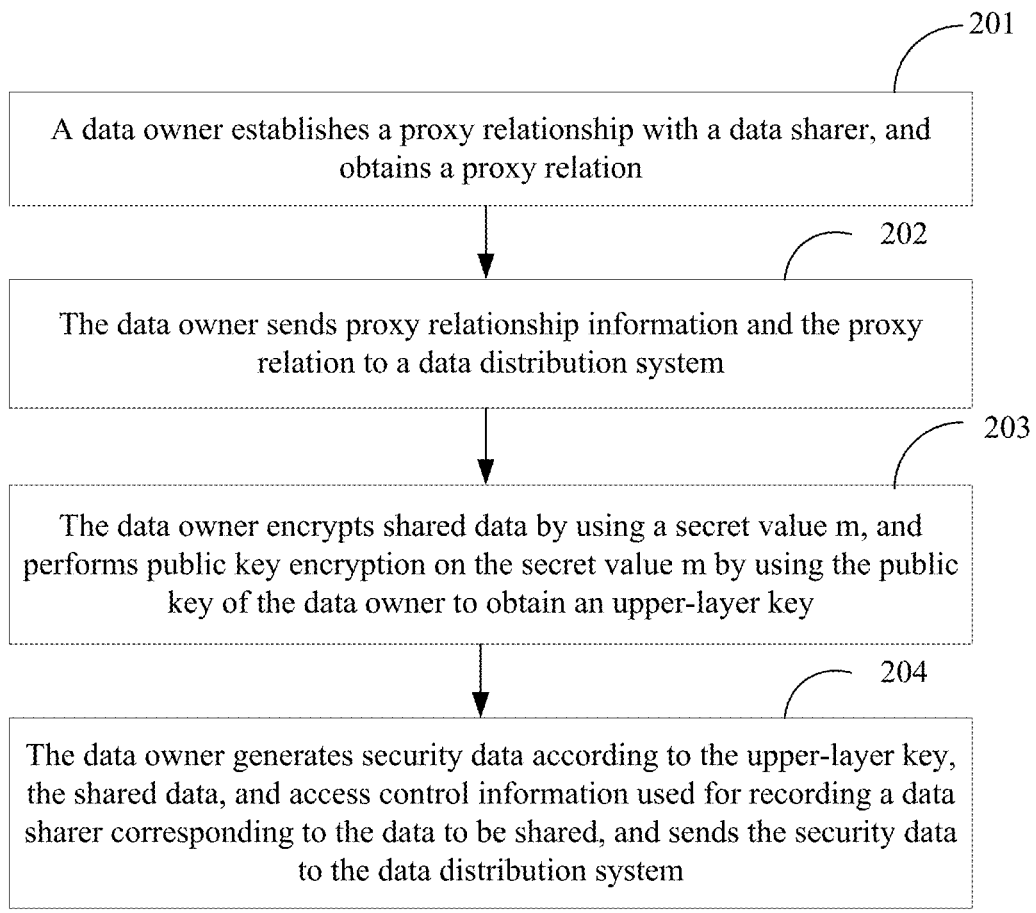
FIG. 3, FIG. 4, FIG. 6, FIG. 7, and FIG. 8 are schematic diagrams of a data protection method according to another embodiment of the present invention.

FIG. 3 is a schematic diagram of a data protection method according to another embodiment of the present invention. The data protection method according to the another embodiment of the present invention includes:

Step 201: A data owner establishes a proxy relationship with a data sharer, and obtains a proxy relation $f_{AB}$.

Step 202: The data owner sends proxy relationship information and the proxy relation $f_{AB}$ to a data distribution system, where, the proxy relationship information includes information about the proxy relationship established between the data owner and the data sharer.

Figure 4:
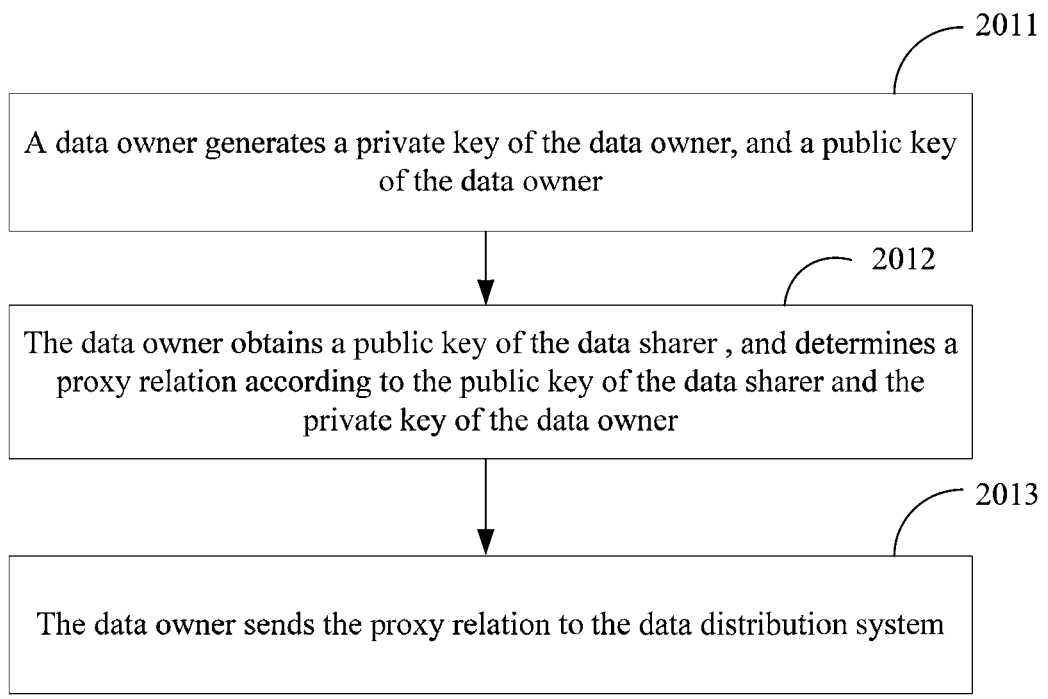

Referring to FIG. 4, the establishing, by a data owner, a proxy relationship with a data sharer, and generating a proxy relation $f_{AB}$ includes:

Step 2011: The data owner generates a private key of the data owner $sk_A=(S_{A1}, S_{A2})$, and a public key of the data owner $pk_A=(P_{A1}, P_{A2})$.

It should be noted that, in the present invention, a representation form similar to $pk_A=(P_{A1}, P_{A2})$ indicates that the public key of the data owner $pk_B$ includes an information sequence formed by at least information in the brackets, namely, $P_{A1}$ and $P_{A2}$, and may also include other information sequences.

In the embodiment of the present invention, the data owner obtains two random numbers $(a_1, a_2)$ using a random number generator, uses $(a_1, a_2)$ as the private key of the data owner, namely, $sk_A=(a_1, a_2)$, and obtains the public key of the data owner $pk_A=(P_{A1}, P_{A2})=(Z^{a_1}, g^{a_2})$ according to preset parameters g and Z.

In the embodiment of the present invention, the preset parameters g and Z separately come from two cyclic groups $G_1$, $G_2$ of order n. A generator of $G_1$ is g, a generator of $G_2$ is h, and $G_2$ may be obtained through bilinear mapping e: $G_1 \times G_1 \to G_2$. In the embodiment of the present invention, the bilinear mapping may be implemented through several existing algorithms in the industry, for example, the miller algorithm, and is not further described here. A value of Z in the public key of the data owner may be obtained from $G_2$ through $Z=e(g, g)$.

Step 2012: The data owner obtains a public key of the data sharer $pk_B=(P_{B1}, P_{B2})$, and determines the proxy relation $f_{AB}$ according to the public key of the data sharer $pk_B=(P_{B1}, P_{B2})$ and the private key of the data owner $sk_A=(S_{A1}, S_{A2})$, namely:

$$f_{AB}=(P_{B2})^{S_{A1}}.$$

When the data owner establishes the proxy relationship with the data sharer, the data owner obtains the public key of the data sharer from the data sharer to generate the proxy relation.

In the embodiment of the present invention, generating modes of the public key of the data sharer and the private key of the data sharer in the data sharer is similar to those of the data owner, that is, obtaining the private key of the data sharer $sk_B=(S_{B1}, S_{B2})=(b_1, b_2)$ by using a random number generator, and then obtaining the public key of the data sharer $pk_B=(Z^{b_1}, g^{b_2})$ according to Z and g that are obtained from the same cyclic groups $G_1$, $G_2$. Therefore, the proxy relation $f_{AB}$ should be $$f_{AB}=(P_{B2})^{S_{A1}}=(g^b)^{a_1}=g^{a_1 \cdot b_2}.$$

Step 2013: The data owner sends the proxy relation $rk_{A \to B}=(P_{B2})^{S_{A1}}$ to the data distribution system.

Still referring to FIG. 3, the data protection method according to the embodiment of the present invention further includes:

Step 203: The data owner encrypts shared data by using a secret value m, and performs public key encryption on the secret value m by using the public key of the data owner $pk_A=(P_{A1}, P_{A2})$ to obtain an upper-layer key $c=(g^k, m(P_{A1})^k)$, where k is a random number. Certainly, in consideration of simplicity of operations, in the embodiment of the present invention, k may be a random integer; further, if security of the secret value m is taken into account, k may be set to non-zero.

After a value of $P_{A1}$ is substituted, $c=(g^k, mZ^{a_1 k})$ may be obtained.

In the embodiment of the present invention, generating the secret value m may be implemented by the following steps: obtaining l through a random number generator, calculating a value of $h^l$, then performing a hash operation on $h^l$, and using a result of the hash operation as the secret value m.

Step 204: The data owner generates security data according to the upper-layer key, the shared data, and access control information used for recording a data sharer corresponding to the data to be shared, and sends the security data to the data distribution system.

Figure 5:
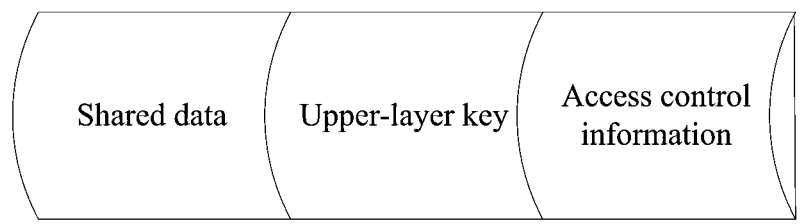
FIG. 5 is a schematic structural diagram of shared data encrypted by using a data protection method according to an embodiment of the present invention.

Referring to FIG. 5, FIG. 5 is a structural diagram of data encrypted by a data owner. It may be seen from the figure that, the data encrypted by the data owner includes shared data, upper-layer key, and access control information. The access control information includes information about a data sharer establishing a proxy relationship with the data owner. Certainly, a data structure shown in FIG. 5 only relates to the part involved in the embodiment of the present invention, while other data information required by application may also be included in the security data, and is not shown in FIG. 5.

If the data sharer wants to obtain the shared data in the data encrypted by the data owner, the data sharer needs to crack the upper-layer key first according to the proxy relation, then can obtain the secret value m, and then obtain the shared data according to the secret value m.

Figure 6:
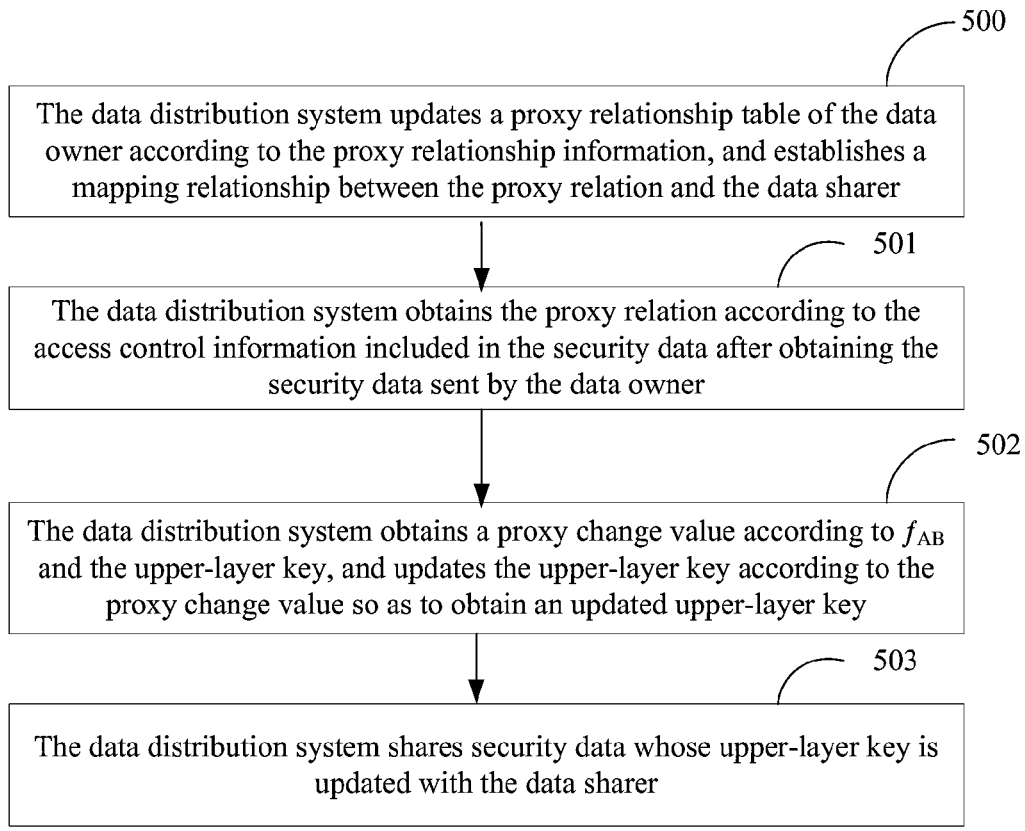

Referring to FIG. 6, after receiving the security data, the data distribution system distributes the security data to the data sharer according to the proxy relationship between the data sharer and the data owner, and a data distribution method includes:

Step 500: The data distribution system updates a proxy relationship table of the data owner according to the proxy relationship information, and establishes a mapping relationship between the proxy relation $f_{AB}$ and the data sharer.

Step 501: The data distribution system obtains a proxy relation $f_{AB}=(P_{B2})^{S_{A1}}$ according to the access control information included in the security data after obtaining the security data sent by the data owner.

In the embodiment of the present invention, after receiving encrypted shared data and the upper-layer key, the data distribution system searches the proxy relationship table according to the access control information and confirms the proxy relationship between the data owner and the data sharer; when the data distribution system confirms that the proxy relationship is established between the data owner and the data sharer, the data distribution system obtains the proxy relation $f_{AB}$ corresponding to the data sharer.

The data distribution system obtains, according to the access control information, information about a data sharer with whom the data owner expects to share data, and obtains a proxy relation generated between a corresponding data sharer and the data owner. If the data distribution system does not find the proxy relation, the data distribution system sends the public key of the data sharer to the data owner, so that the data owner generates a corresponding proxy relation.

Step 502: The data distribution system obtains a proxy change value $e(g^k, f_{AB})$ from a G2 cyclic group according to $f_{AB}$ and the upper-layer key $c=(g^k, m (P_{A1})^k)$, and updates the upper-layer key $c=(g^k, m(P_{A1})^k)$ according to the proxy change value $e(g^k, f_{AB})$ to obtain an updated upper-layer key $c'=(e(g^k, f_{AB}), m(P_{A1})^k)$.

In the embodiment of the present invention, $f_{AB}=(P_{B2})^{S_{A1}}=g^{a_1 b_2}$; therefore, $e(g^k, f_{AB})=e(g^k, g^{a_1 b_2})$; because e: $G_1 \times G_1 \to G_2$, and g is a generator of $G_1$, $e(g^k, g^{a_1 b_2})=Z^{ka_1 b_2}$ may be obtained. Therefore, the updated upper-layer key is $c'=(Z^{ka_1 b_2}, m(P_{A1})^k)$.

Step 503: The data distribution system shares security data whose upper-layer key is updated with the data sharer.

Figure 7:
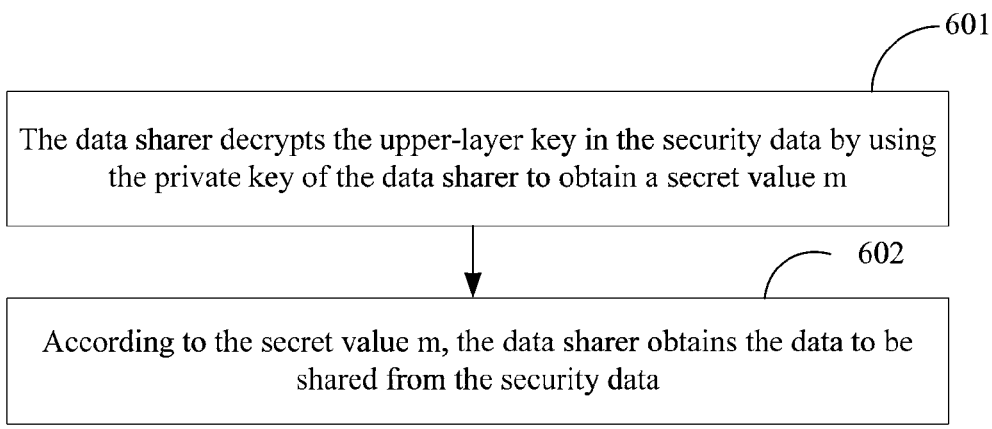

Referring to FIG. 7, a decrypting method in which the data sharer decrypts security data according to its private key after obtaining the security data from the data distribution system includes:

Step 601: The data sharer decrypts the upper-layer key in the security data by using the private key of the data sharer $sk_B$ to obtain a secret value m.

Step 602: According to the secret value m, the data sharer obtains the data to be shared from the security data.

In the embodiment of the present invention, the data sharer decrypts the updated upper-layer key) $c'=(Z^{ka_1 b_2}, m(P_{A1})^k)$ according to the private key of the data sharer $sk_B=(S_{B1}, S_{B2})=(b_1, b_2)$ to obtain the secret value m, namely, $$m = \frac{(m(P_{A1})^k)}{Z^{\frac{ka_1 b_2}{S_{B2}}}} = \frac{m(P_{A1})^k}{Z^{ka_1}}, \text{ or}$$

$$m = \frac{m((P_{A1})^k)^{S_{B2}}}{Z^{ka_1 b_2}} = \frac{m(P_{A1})^{k \cdot S_{B2}}}{Z^{ka_1}}.$$

Therefore, because $P_{A1}=Z^{a_1}$, and $S_{B2}=b_2$, the data sharer obtains the correct secret value m and may obtain, according to the secret value m, the data shared by the data owner.

To further improve a security coefficient, an embodiment of the present invention further provides a data protection method. In the method, a data owner establishes multiple proxy relations with a data sharer, and distributes the proxy relations to multiple data distribution systems, while the data sharer needs to integrate updated upper-layer keys sent by all data distribution systems, and only in this way, normal decryption can be performed.

Figure 8:
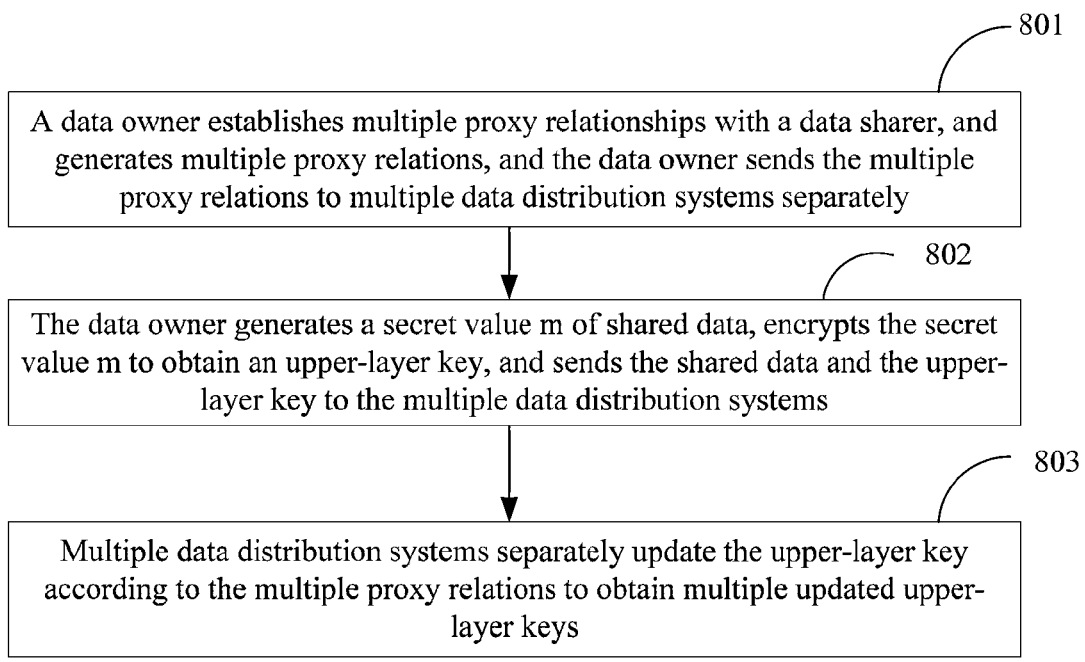

Referring to FIG. 8, a data protection method for multiple data distribution systems according to an embodiment of the present invention includes:

Step 801: A data owner generates multiple proxy relations with a data sharer, and the data owner sends the multiple proxy relations to multiple data distribution systems separately.

The multiple proxy relations correspond, in a one-to-one manner, to the multiple data distribution systems participating in data sharing.

Specifically, generating modes of a private key and a public key of the data owner and the data sharer are the same as the foregoing description, and are not further described here. It should be noted that, the data owner establishes a proxy relationship with the data sharer, and generates a proxy relation according to $f_{AB}(i)=(P_{B2})^{r_i}$, where $f_{AB}(i)$ is a proxy relation corresponding to an $i^{th}$ data distribution system, that is, $f_{AB}(i)$ is sent to the $i^{th}$ data distribution system.

$\Sigma_{i=1}^{T} r_i = S_{A1}$, where T is the number of the multiple data distribution systems.

Step 802: The data owner generates a secret value m of shared data, encrypts the secret value m to obtain an upper-layer key, and sends the shared data and the upper-layer key to the multiple data distribution systems.

In this step, the secret value m and the upper-layer key may be generated by using a method same as or similar to the method in the foregoing two embodiments, which is not further described here.

Step 803: The multiple data distribution systems separately update the upper-layer key according to the multiple proxy relations to obtain multiple updated upper-layer keys.

In the embodiment of the present invention, the $i^{th}$ data distribution system updates the upper-layer key $c=(g^k, m(P_{A1})^k)$ according to $f_{AB}(i)=(P_{B2})^{r_i}$ to obtain an updated upper-layer key $c_i'=(e(g^k, f_{AB}(i)), m(P_{A1})^k)$ of the $i^{th}$ data distribution system.

Step 804: The data sharer obtains the multiple updated upper-layer keys from the multiple data distribution systems, the data sharer obtains a combined key according to the multiple upper-layer keys, and decrypts the combined key to obtain the secret value m.

In the embodiment of the present invention, the combined key is $c_{combined}'=(\Pi_{i=1}^{T} e(g^k, f_{AB}(i)), m(P_{A1})^k)$, where T is the number of the multiple data distribution systems, and the secret value m is $$m = \frac{m(P_{A1})^{k \cdot S_{B2}}}{\prod_{i=1}^{T} e(g^k, f_{AB}(i))}.$$

It may be seen from actual application that, $f_{AB} = (P_{B2})^{r_i} = g^{r_i b_2}$, and $e(g^k, f_{AB}(i)) = e(g^k, g^{r_i b_2}) = Z^{k b_2 r_i}$. Therefore, $c_i = (Z^{k b_2 r_i}, h^i Z^{k a_1})$. Accordingly, $$\prod_{i=1}^{T} e(g^k, f_{AB}(i)) = \prod_{i=1}^{T} Z^{k b_2 r_i} = Z^{k b_2 \Sigma_{i=1}^{T} r_i} = Z^{k b_2 a_1}.$$

Therefore, the following may be obtained:

$$m = \frac{m(Z^{k a_1})^{b_2}}{Z^{k b_2 a_1}}.$$

Therefore, the data sharer may decrypt the shared data according to the secret value.

With the data protection method provided in the embodiment of the present invention, the proxy relationship between the data owner and the data sharer is separately stored in multiple data distribution systems, while the data sharer can obtain the secret value m through decryption only according to the updated upper-layer keys sent by all data distribution systems, so that security of data encryption is further improved on an existing basis.

Figure 9:
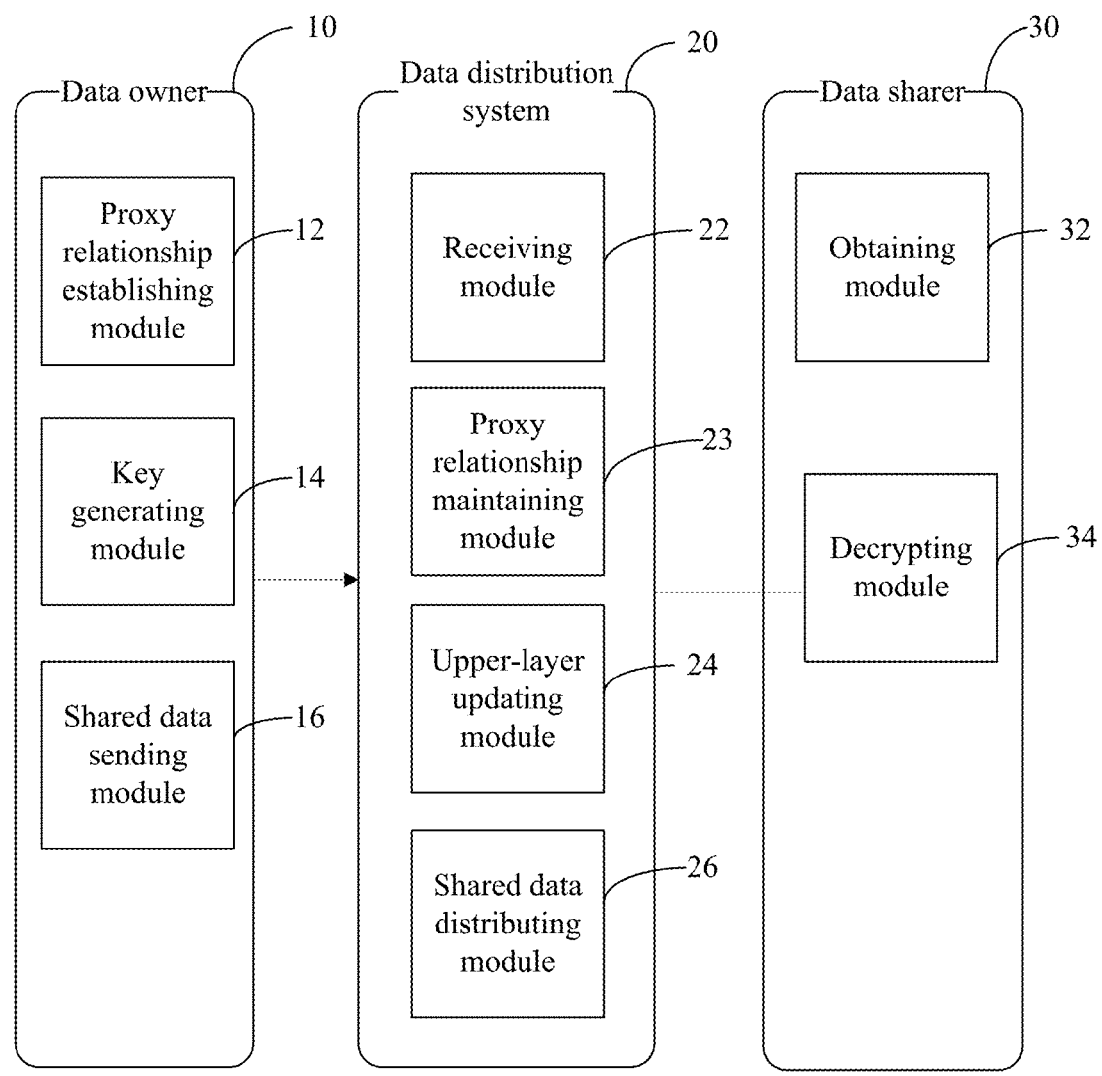
FIG. 9 is a schematic diagram of a data sharing system according to an embodiment of the present invention.

Still referring to FIG. 9, FIG. 9 is a schematic diagram of a data sharing system used for applying the data protection method provided in the embodiment of the present invention according to an embodiment of the present invention. The data sharing system provided in the embodiment of the present invention includes a data owner 10, a data distribution system 20, and a data sharer 30.

The data owner 10 includes: a proxy relationship establishing module 12, a key generating module 14, and a shared data sending module 16.

The proxy relationship establishing module 12 is configured to establish a proxy relationship with the data sharer 10, generate a proxy relation according to a private key of the data owner and a public key of the data sharer, and send proxy relationship information and the proxy relation $f_{AB}$ to the data distribution system, where the proxy relationship information includes information about the proxy relationship established between the data owner and the data sharer.

In the embodiment of the present invention, a public key of the data owner, the private key of the data owner, the public key of the data sharer, and a private key of the data sharer may be generated by using a method same as or similar to the data protection method provided in the embodiment of the present invention, which is not further described here. The public key of the data owner and the private key of the data owner may be generated by the proxy relationship establishing module, and may also be generated by other modules such as a dedicated key generating module.

The proxy relation may be generated by using the data protection method provided in the embodiment of the present invention, depending on the number of data distribution systems. Specifically, in the data distribution system provided in the embodiment of the present invention, if a data owner provides shared data to a data sharer through only one data distribution system, the proxy relation may be obtained according to $f_{AB} = (P_{B2})^{S_{A1}}$; if a data owner provides shared data to a data sharer through multiple data distribution systems, the data owner generates a proxy relation $f_{AB}(i) = (P_{B2})^{r_i}$ for each data distribution system, where $f_{AB}(i)$ indicates a proxy relation corresponding to an $i^{th}$ data distribution system; and $\Sigma_{i=1}^{T} r_i = S_{A1}$, where T is the number of the multiple data distribution systems.

The key generating module 14 is configured to generate a secret value m of the shared data, encrypt the shared data by using the secret value m, and encrypt the secret value m by using the public key of the data owner to obtain an upper-layer key.

The secret value m and upper-layer key may be generated by using a method same as or similar to the data protection method provided in the embodiment of the present invention, which is not further described here.

The shared data sending module 16 is configured to send the encrypted shared data and the upper-layer key to the data distribution system 20.

The data distribution system 20 includes a receiving module 22, a proxy relationship maintaining module 23, an upper-layer key updating module 24, and a shared data distributing module 26.

The receiving module 22 is configured to obtain the proxy relationship information, the proxy relation, the encrypted shared data, and the upper-layer key that are from the data owner 10.

The proxy relationship maintaining module 23 is configured to update a proxy relationship table of the data owner according to the proxy relationship information, and establish a mapping relationship between the proxy relation $f_{AB}$ and the data sharer, and when the receiving module receives the encrypted shared data and the upper-layer key, the proxy relationship maintaining module is further configured to search the proxy relationship table and confirm the proxy relationship between the data owner and the data sharer, and obtain the proxy relation $rk_{A \to B}$ corresponding to the data sharer after confirming that the proxy relationship is established between the data owner and the data sharer.

The upper-layer key updating module 24 is configured to update the upper-layer key according to the proxy relation generated by the data owner 10 to obtain an updated upper-layer key.

In the embodiment of the present invention, the upper-layer key may be updated by using a method same as or similar to the data protection method provided in the embodiment of the present invention. Specifically, if the data owner 10 distributes shared data to the data sharer 30 through only one data distribution system 20, the upper-layer key updating module 24 obtains a proxy change value $e(g^k, f_{AB})$ from a G2 cyclic group according to the proxy relation $f_{AB}$ and the upper-layer key $c = (g^k, m(P_{A1})^k)$, and updates the upper-layer key $c = (g^k, m(P_{A1})^k)$ according to the proxy change value $e(g^k, f_{AB})$ to obtain the updated upper-layer key $c' = (e(g^k, f_{AB}), m(P_{A1})^k)$; if the data owner 10 distributes shared data to the data sharer 30 through multiple data distribution systems 20, the $i^{th}$ data distribution system updates the upper-layer key $c = (g^k, m(P_{A1})^k)$ through the upper-layer key updating module 24 according to $f_{AB}(i) = (P_{B2})^{r_i}$ to obtain the updated upper-layer key $c_i' = (e(g^k, f_{AB}(i)), m(P_{A1})^k)$ of the $i^{th}$ data distribution system.

The distributing module 26 is configured to send the shared data and the updated upper-layer key to the data sharer.

The data sharer 30 includes an obtaining module 32 and a decrypting module 34.

The obtaining module 32 is configured to receive the shared data and the updated upper-layer key that are from the data distribution system 20.

The decrypting module 34 is configured to decrypt the updated upper-layer key according to the private key of the data sharer to obtain the secret value m.

The secret value m may be obtained by using a method same as or similar to the data protection method provided in the embodiment of the present invention. Specifically, when the data owner 10 distributes shared data to the data sharer 30 through one data distribution system 20, the data sharer obtains m according to the private key of the data sharer $sk_B=(S_{B1}, S_{B2})$ and the formula $$m = \frac{(m(P_{A1})^k)^{S_{B2}}}{e(g^k, f_{AB})};$$

when the data owner 10 distributes shared data to the data sharer 30 through multiple data distribution systems 20, the data sharer receives the updated upper-layer keys from the multiple data distribution systems 20, then obtains a combined key $c_{combined}'=(\Pi_{i=1}^{T}e(g^k, f_{AB}(i)), m(P_{A1})^k)$ according to the updated upper-layer keys, and then according to the combined key, calculates and obtains the secret value m $$m = \frac{(m(P_{A1})^k)^{S_{B2}}}{\prod_{i=1}^{T} e(g^k, f_{AB}(i))}.$$

Certainly, the data sharer also includes a sharer key generating module, configured to generate the public key of the data sharer and the private key of the data sharer. For a generating method, reference may be made to a corresponding method provided in the data protection method in the embodiment of the present invention.

Further, the data owner of the data sharing system provided in the embodiment of the present invention further includes a key updating module, configured to update the private key of the data owner and the public key of the data owner. Specifically, the key updating module generates a second private key of the data owner $sk_A'=(S_{A1}', S_{A2}')$ and a second public key of the data owner $pk_A'=(P_{A1}', P_{A2}')$, and calculates an update coefficient $t_1=S_{A1}'/S_{A1}$; the key updating module is further configured to send the update coefficient $t_1=S_{A1}'/S_{A1}, t_2=S_{A2}'/S_{A2}$ to the data distribution system. Accordingly, the data distribution system includes a key update responding module, configured to obtain a new proxy relation, namely, $f_{AB}'=(f_{AB})^{t_1}$, or $f_{AB}'(i)=(f_{AB}(i))^{t_1}$ according to the update coefficient. After receiving the shared data and upper-layer key, the data distribution system may update the upper-layer key according to the new proxy relation.

Through the preceding description of the embodiments, those skilled in the art may understand that the present invention may be implemented by software in addition to a necessary universal hardware platform, and certainly may also be implemented by hardware. However, in most circumstances, the former is a preferred implementation manner. Based on such understanding, the essence of the technical solutions of the present invention or part that makes contributions to the prior art may be embodied in the form of a software product. The computer software product may be stored in a storage medium, such as a ROM/RAM, a magnetic disk, an optical disk, and so on, and include several instructions to enable a computer device (which may be a personal computer, a server, a network device, and so on) to execute the method described in the embodiments of the present invention or some parts of the embodiments.

The foregoing description are only exemplary embodiments of the present invention. It should be specified that, persons of ordinary skill in the art may further make various improvements and modifications without departing from the principles of the present invention, and these improvements and modifications shall also fall within the scope of the present invention.

What is claimed is:

1. A data protection method, comprising:
establishing, by a data owner, a proxy relationship with a data sharer, and generating a proxy relation $f_{AB}$ according to a private key of the data owner $sk_A$ and a public key of the data sharer $pk_B$;
sending, by the data owner, proxy relationship information and the proxy relation $f_{AB}$ to a data distribution system, wherein the proxy relationship information comprises information about the proxy relationship established between the data owner and the data sharer;
updating, by the data distribution system, a proxy relationship table of the data owner according to the proxy relationship information, and establishing a mapping relationship between the proxy relation $f_{AB}$ and the data sharer, wherein the proxy relationship table is used to record information about a data sharer establishing a proxy relationship with the data owner;
generating, by the data owner, a secret value m of shared data, and encrypting the shared data by using the secret value m;
encrypting, by the data owner and by using a public key of the data owner $pk_A$, the secret value m to obtain an upper-layer key;
sending, by the data owner, the shared data encrypted by the secret value m and the upper-layer key to the data distribution system;
after receiving the encrypted shared data and the upper-layer key, searching, by the data distribution system, the proxy relationship table and confirming the proxy relationship between the data owner and the data sharer, and when the data distribution system confirms that the proxy relationship is established between the data owner and the data sharer, obtaining, by the data distribution system, the proxy relation $f_{AB}$ corresponding to the data sharer; updating, by the data distribution system, the upper-layer key according to the proxy relation $f_{AB}$ to obtain an updated upper-layer key;
sending, by the data distribution system, the encrypted shared data and the updated upper-layer key to the data sharer;
decrypting, by the data sharer and according to a private key of the data sharer $sk_B$, the updated upper-layer key to obtain the secret value m; and
decrypting, by the data sharer, the encrypted shared data according to the secret value m to obtain the shared data;
wherein: the private key of the data owner is $sk_A=(S_{A1}, S_{A2})$, wherein $S_{A1}$ and $S_{A2}$ are two elements of the private key of the data owner;
the public key of the data owner is $Pk_A=(P_{A1}, P_{A2})$, wherein $P_{A1}$ and $P_{A2}$ are two elements of the public key of the data owner;
the private key of the data sharer is $sk_B=(S_{B1}, S_{B2})$, wherein $S_{B1}$ and $S_{B2}$ are two elements of the private key of the data sharer;
the public key of the data sharer is $pk_B=(P_{B1}, P_{B2})$, wherein $P_{B1}$ and $P_{B2}$ are two elements of the public key of the data sharer; and
$S_{A1}=a_1$, $S_{A2}=a_2$, $P_{A1}=Z^{a_1}$, $P_{A2}=g^{a_2}$, $S_{B1}=b_1$, $S_{B2}=b_2$, $P_{B1}=Z^{b_1}$, and $P_{B2}=g^{b_2}$, wherein $a_1$, $a_2$, $b_1$, and $b_2$ are all random numbers, a preset parameter g is a generator of a cyclic group $G_1$, Z is an element of a cyclic group $G_2$, $G_2$ is e: $G_1 \times G_1 \rightarrow G_2$ obtained by $G_1$ through bilinear mapping, and Z=e(g, g);

wherein the establishing, by a data owner, a proxy relationship with a data sharer, and generating a proxy relation, and the sending, by the data owner, the proxy relation to a data distribution system comprise:

establishing, by the data owner, the proxy relationship with the data sharer, and generating multiple proxy relations, and sending, by the data owner, each relation in the multiple proxy relations to a corresponding data distribution system in multiple data distribution systems separately;

the updating, by the data distribution system, the upper-layer key according to the proxy relation to obtain an updated upper-layer key comprises:

updating, by each data distribution system and according to a proxy relation received by itself separately, the upper-layer key to obtain an updated upper-layer key;

the decrypting, by the data sharer and according to a private key of the data sharer, the updated upper-layer key to obtain the secret value m comprises:

obtaining, by the data sharer and according to multiple updated upper-layer keys generated by the multiple data distribution systems, a combined key; and obtaining, by the data sharer and according to the combined key and the private key of the data sharer, the secret value m;

wherein the establishing, by the data owner, the proxy relationship with the data sharer, and generating multiple proxy relations, and the sending, by the data owner, each proxy relation in the multiple proxy relations to a corresponding data distribution system in multiple data distribution systems separately comprise:

according to the private key of the data owner and the public key of the data sharer and according to a formula $$f_{AB}(i) = (P_{B2})^{r_i}; \text{ and}$$

generating, by the data owner and the data sharer, the multiple proxy relations corresponding to the multiple data distribution systems in a one-to-one manner, wherein $f_{AB}$ (i) indicates a proxy relation corresponding to an $i^{th}$ data distribution system, and $\Sigma_{i=1}^{T} r_i = S_{A1}$, wherein T is the number of the multiple data distribution systems.

2. The data protection method according to claim 1, wherein the encrypting, by the data owner and by using a public key of the data owner, the secret value m to obtain an upper-layer key comprises:

performing public key encryption on the secret value m by using the public key of the data owner $(P_{A1}, P_{A2})$ to obtain an upper-layer key $(g^k, m(P_{A1})^k)$, wherein k is a random number; and the updating, by the multiple data distribution systems and according to the multiple proxy relations, the upper-layer key to obtain multiple updated upper-layer keys comprises:

updating, by the $i^{th}$ data distribution system and according to the proxy relation $f_{AB}(i) = (P_{B2})^{r_i}$, the upper-layer key $(g^k, m(P_{A1})^k)$ to obtain an updated upper-layer key $(e(g^k, f_{AB}(i)), m(P_{A1})^k)$ of the $i^{th}$ data distribution system.

3. The data protection method according to claim 1, wherein the combined key is $(\Pi_{i=1}^{T} e(g^k, f_{AB}(i)), m(P_{A1})^k)$, and the obtaining, according to the combined key, the secret value m comprises:

solving the secret value m according to a formula $$m = \frac{(m(P_{A1})^k)^{S_{B2}}}{e(g^k, f_{AB})}.$$

4. A data sharing system, comprising:
a data owner,
a data distribution system,
a data sharer, wherein the data owner distributes shared data to the data sharer through the data distribution system;

the data owner comprises a proxy relationship establishing module, a key generating module, and a shared data sending module;

the data distribution system comprises a receiving module, a proxy relationship maintaining module, an upper-layer key updating module, and a shared data distributing module;

the data sharer comprises an obtaining module and a decrypting module, wherein:

the proxy relationship establishing module is configured to establish a proxy relationship with the data sharer, generate a proxy relation $f_{AB}$ according to a private key of the data owner $sk_A$ and a public key of the data sharer $pk_B$, and send proxy relationship information and the proxy relation $f_{AB}$ to the data distribution system, wherein the proxy relationship information comprises information about the proxy relationship established between the data owner and the data sharer;

the key generating module is configured to generate a secret value m of the shared data, encrypt the shared data by using the secret value m, and encrypt the secret value m by using a public key of the data owner $pk_A$ to obtain an upper-layer key;

the shared data sending module is configured to send encrypted shared data and the upper-layer key to the data distribution system;

the receiving module is configured to obtain the proxy relationship information, the proxy relation, the encrypted shared data, and the upper-layer key that are from the data owner;

the proxy relationship maintaining module is configured to update a proxy relationship table of the data owner according to the proxy relationship information, and establish a mapping relationship between the proxy relation $f_{AB}$ and the data sharer, and when the receiving module receives the encrypted shared data and the upper-layer key, the proxy relationship maintaining module is further configured to search the proxy relationship table and confirm the proxy relationship between the data owner and the data sharer, and obtain the proxy relation $f_{AB}$ corresponding to the data sharer when confirming that the proxy relationship is established between the data owner and the data sharer, wherein the proxy relationship table is used to record information about a data sharer establishing a proxy relationship with the data owner;

the upper-layer key updating module is configured to update the upper-layer key according to the proxy relation to obtain an updated upper-layer key;

the distributing module is configured to send the shared data and the updated upper-layer key to the data sharer;

the obtaining module is configured to receive the shared data and the updated upper-layer key that are from the data distribution system; and the decrypting module is configured to decrypt the updated upper-layer key according to a private key of the data sharer $sk_B$ to obtain the secret value m;

wherein:

the private key of the data owner is $sk_A=(S_{A1}, S_{A2})$, wherein $S_{A1}$ and $S_{A2}$ are two elements of the private key of the data owner;

the public key of the data owner is $pk_A=(P_{A1}, P_{A2})$, wherein $P_{A1}$ and $P_{A2}$ are two elements of the public key of the data owner;

the private key of the data sharer is $sk_B=(S_{B1}, S_{B2})$, wherein $S_{B1}$ and $S_{B2}$ are two elements of the private key of the data sharer;

the public key of the data sharer is $pk_B=(P_{B1}, P_{B2})$, wherein $P_{B1}$ and $P_{B2}$ are two elements of the public key of the data sharer; and $S_{A1}=a_1$, $S_{A2}=a_2$, $P_{A1}=Z^{a_1}$, $P_{A2}=g^{a_2}$, $S_{B1}=b_1$, $S_{B2}=b_2$, $P_{B1}=Z^{b_1}$, and $P_{B2}=g^{b_2}$, wherein $a_1$, $a_2$, $b_1$, and $b_2$ are all random numbers, a preset parameter g is a generator of a cyclic group $G_1$, Z is an element of a cyclic group $G_2$, $G_2$ is e: $G_1 \times G_1 \rightarrow G_2$ obtained by $G_1$ through bilinear mapping, and $Z=e(g, g)$;

wherein:

the data sharing system comprises multiple data distribution systems;

the data owner distributes data to the data sharer through the multiple data distribution systems; and the proxy relationship establishing module generates multiple proxy relations according to $f_{AB}(i)=(P_{B2})^{r_i}$, and sends the multiple proxy relations to the multiple data distribution systems separately, wherein $f_{AB}(i)$ indicates a proxy relation sent to an $i^{th}$ data distribution system, and $\Sigma_{i=1}^{T} r_i = S_{A1}$, wherein T is the number of the multiple data distribution systems.

5. The data sharing system according to claim 4, wherein:

the key generating module performs public key encryption on the secret value m by using the public key of the data owner $(P_{A1}, P_{A2})$ to obtain an upper-layer key $(g^k, m(P_{A1})^k)$, wherein k is a random number; and the upper-layer key updating module updates the upper-layer key $(g^k, m(P_{A1})^k)$, according to the proxy relation $f_{AB}(i)=(P_{B2})^{r_i}$ to obtain an updated upper-layer key $(e(g^k, f_{AB}(i)), m(P_{A1})^k)$ of the $i^{th}$ data distribution system.

6. The data sharing system according to claim 5, wherein:

the decrypting module obtains a combined key $(\Pi_{i=1}^{T} e(g^k, f_{AB}(i)), m(P_{A1})^k)$ according to the updated upper-layer key $(e(g^k, f_{AB}(i)), m(P_{A1})^k)$ obtained from the multiple data distribution systems, and the decrypting module obtains the secret value m $$m = \frac{(m(P_{A1})^k)^{S_{B2}}}{\prod_{i=1}^{T} e(g^k, f_{AB}(i))}$$

according to the combined key $(\Pi_{i=1}^{T} e(g^k, f_{AB}(i)), m(P_{A1})^k)$.

7. The data sharing system according to claim 4, wherein:

the data owner further comprises a key updating module, configured to update the private key of the data owner and the public key of the data owner, wherein the key updating module generates a second private key of data owner $(S_{A1}', S_{A2}')$ and a second public key of the data owner $(P_{A1}', P_{A2}')$ and calculates an update coefficient $t_1=S_{A1}'/S_{A1}$, and the data owner is further configured to send the update coefficient $t_1=S_{A1}'/S_{A1}$ to the data distribution system; and the data distribution system further comprises a key update responding module, configured to update the proxy relation, namely, $f_{AB}'(f_{AB})^{t_1}$, or $f_{AB}'(i)=(f_{AB}(i))^{t_1}$ according to the update coefficient.

* * * * *